United States Patent [19]
Herrick

[11] Patent Number: 5,440,636
[45] Date of Patent: Aug. 8, 1995

[54] APPARATUS AND METHOD FOR PROCESSING OF FREQUENCY HOPPING COMMUNICATIONS

[75] Inventor: David L. Herrick, Hudson, N.H.

[73] Assignee: Lockheed Sanders, Inc., Nashua, N.H.

[21] Appl. No.: 19,452

[22] Filed: Feb. 27, 1987

[51] Int. Cl.⁶ .................. H04K 1/10; H04L 27/10
[52] U.S. Cl. .......................... 380/34; 375/1
[58] Field of Search ................ 375/1; 380/34

[56] References Cited
U.S. PATENT DOCUMENTS

| | | | |
|---|---|---|---|
| 2,982,853 | 5/1961 | Price et al. ............................ | 375/1 |
| 3,691,464 | 9/1972 | Dayton et al. ........................ | 375/1 |
| 3,714,573 | 1/1973 | Grossman ............................. | 375/1 |
| 4,100,498 | 7/1978 | Alsup et al. .......................... | 375/1 |
| 4,217,586 | 8/1980 | McGuffin .............................. | 375/1 |
| 4,247,939 | 1/1981 | Stromswold et al. ................ | 375/1 |
| 4,313,147 | 1/1982 | Maxemchuk ......................... | 375/1 |
| 4,583,231 | 4/1986 | Pukette ................................. | 375/1 |
| 4,656,642 | 4/1987 | Apostolos et al. ................... | 375/1 |

Primary Examiner—Salvatore Cangialosi
Attorney, Agent, or Firm—David W. Gomes

[57] ABSTRACT

The present invention relates to signal processors and processing, and more particularly to apparatus and method for sensing, detection and/or demodulation of frequency hopping signals.

9 Claims, 5 Drawing Sheets

APPARATUS AND METHOD FOR PROCESSING OF FREQUENCY HOPPING COMMUNICATIONS

BACKGROUND OF THE INVENTION

Single channel receivers can be used to detect and demodulate transmitted signals having a single carrier frequency or central frequency. Examples of such signals are amplitude modulation (AM) signals, single sideband (SSB) and other frequency modulation (FM) signals, and pulse code modulation (PCM) and other pulse modulation (PM) signals. Such signals can be encrypted or otherwise modified to interfere with the ability of a hostile receiver to demodulate, jam or utilize such signals. However, encryption can sometimes be defeated by a sufficiently capable hostile receiver.

To avoid effective intercept or reception of a transmitted signal by a hostile receiver, frequency hopping or spread spectrum transmission has been used. Frequency hopping involves changing the center or carrier frequency of a transmitted signal in a manner already known to a friendly receiver, but intended to be unknown to a hostile receiver. Such changes can be rapid, such as 100 hops per second. Reception of a frequency hopping signal by a single channel receiver is thereby effectively defeated.

Existing frequency hop transmitters, receivers and transceivers often use the 30–88 MHz VHF band, with about 100 hops per second, over from only a nominal 5 MHz band up to over the full 58 MHz VHF bandwidth. Analog FM voice or digital CVSD voice data signals have been used. Other bands and other hop rates have also been used.

A minimum of 90% of the transmitted signal at each frequency hop should be recovered to produce a usable signal. For example, for a transmitter operating at 100 hops per second, its transmitted signal remains at any one frequency for only 1/100 of a second=10 milliseconds per hop. This leaves 10% of 10 milliseconds=1 millisecond for signal detection. A VHF frequency hopping transmitter using the full 58 MHz VHF bandwidth with 25 KHz-wide channels would have 58 MHz/25 KHz=2320 channels. A step-tuned conventional receiver would then have to be able to search all 2320 channels in one millisecond, which is beyond the capability of most conventional receivers. The minimum dwell time per channel of a conventional superheterodyne receiver should be longer than the impulse response of its filter, which is the inverse of its bandwidth, or 1/(25 KHz)=40 microseconds. In the illustrative example, 40 microseconds per channel times 2320 channels equals 92.8 milliseconds, which is much greater than one millisecond; a frequency-hopping transmitter would hop nine times in 92.8 milliseconds.

One approach to detecting frequency hopping transmitted signals has been to perform rapid, wideband spectral analysis to detect the frequency hopper's current active channel or current hop frequency on the basis of frequency, dwell time, direction of arrival, and signal amplitude. A conventional superheterodyne receiver is then tuned to the current frequency of the hopping signal. This approach requires two receivers: one rapid wideband search receiver for hop detection and current frequency identification, and one for demodulation of the actual signal. While such devices have served the purpose, they have not proven entirely satisfactory because complex, heavy, physically large apparatus, requiring substantial amounts of power, is required by this approach. Power requirements may be so large as to prevent or reduce ready portability, physical concealment, electrical concealment, and application to covert use.

SUMMARY OF THE INVENTION

Accordingly, it is a general purpose of the present invention to provide apparatus and method for identification, detection and reception of frequency hopping signal(s).

Other objects of the present invention are to provide apparatus and method, for identification, detection and reception of frequency hopping signal(s), which can be small, lightweight, and portable.

Further objects of the present invention are to provide apparatus and method, for identification, detection and reception of frequency hopping signal(s), which does not require large power consumption.

A still further object of the present invention is to provide apparatus and method for jamming of frequency hopping signal(s).

Briefly, these and other objects of the present invention are accomplished by apparatus and method which accomplishes both fast wideband detection of a frequency hopping signal, and the narrowband demodulation of such a signal, by performing a transformation of that signal, and then performing the inverse of such transformation of that signal. Hop detection is performed on the transformed signal. The inversely transformed version of the transformed signal is demodulated. The inversely transformed version of the transformed signal can also be provided to a modulator and therefrom to a transmitter for jamming the original transmitted signal.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
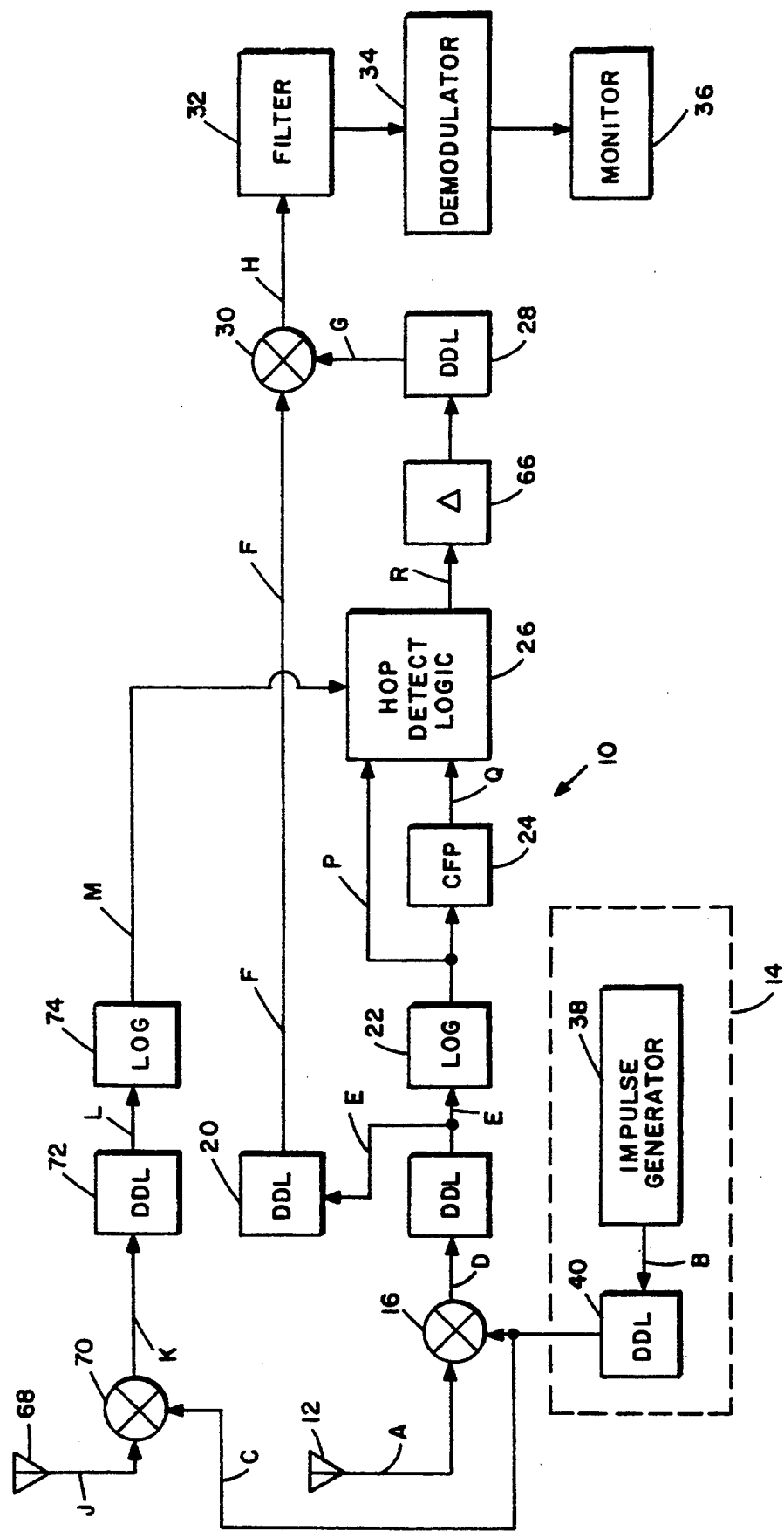
FIG. 1 is a block diagram of a receiver for frequency hopping signals according to the present invention.

Referring now to the drawings, wherein like reference characters designate like or corresponding parts or signals throughout the several views, there is shown in FIG. 1 a receiver 10. Receiver 10 includes antenna 12, local oscillator 14, mixer 16, dispersive delay line (DDL) 18, dispersive delay line 20, logarithmic processor 22, processor 24, hop detector 26, dispersive delay line 28, mixer 30, filter 32, demodulator 34 and monitor 36.

Antenna 12 is preferably an omnidirectional antenna. Local oscillator 14 can include an impulse generator 38, and a dispersive delay line 40 such as a quadratic phase dispersive delay line. Alternatively, local oscillator 14 can be a conventional swept local oscillator or the like.

Mixers 16 and 30 can each be a mixer, a multiplier, or other suitable device, but are preferably each a mixer. Dispersive delay lines 18, 20, 28 and 40 are preferably each a quadratic phase dispersive delay line, e.g. the group delay is a linear function of frequency. Dispersive delay lines and their utilization in a spread spectrum detector is described in Chester E. Stromswold et al. U.S. Pat. No. 4,247,939 issued Jan. 27, 1981, which is hereby incorporated by reference. Logarithmic processor 22 can be a logarithmic video processor. Logarithmic processor 22 can be a logarithmic envelope detector, producing an output signal that is a logarithmic (such as the natural logarithm or the common logarithm) of the input to logarithm processor 22. Logarithmic processor 22 produces a logarithmic amplitude (for example) response for wide dynamic range of receiver 10. Processor 24 processes received signal waveforms and produces one impulse or spike per signal per oscillator 14 sweep response thereto. Processor 24 can for example be a double differentiator, or can be a center finder pulse generator, or can be a center frequency detector, such as that described at FIG. 1 and column 5, lines 31–38 of U.S. Pat. No. 4,247,939. Memory 48 and memory 50 can for example each be a random access memory (RAM) of dimensions 1200×28 bits. Counter 44 can for example be a twelve-bit address counter. Clock 42 can for example be a 24 MHz clock. When pulsed by comparator 42, for a preset time-period processor 52 alternatively provides data from comparator 42 to memory 48 and memory 50, and reviews the signal data stored in memory 48 and in memory 50. Processor 52 thus reviews for frequency hopping the signal history in memory 48 and memory 50 over several sweeps, and updates that history. Memory 48 and memory 50 show whether a transmitted signal was present during a specified portion of a specified sweep.

Filter 32 can for example be a low pass filter. Demodulator 34 can be any appropriate demodulator, such as an FM demodulator or an AM demodulator. Monitor 36 can be a set of headphones, a recorder, a loudspeaker, an oscilloscope, a display, or a combination thereof, or other suitable device or devices.

Hop detector 26 recognizes frequency hopping signals by their short dwell times at individual frequencies, and generates an impulse upon recognizing a frequency hopping signal. Hop detector 26 is a logic device that examines the series of pulses, produced by dispersive delay line 18 from sweep to sweep, for whether a preset dwell time per frequency threshold is exceeded. Hop detector 26 can for example be a Model HSA-500 or Model 8952 High Speed Alarm device available from Sanders Associates, Inc., Nashua, N.H.

Figure 2:
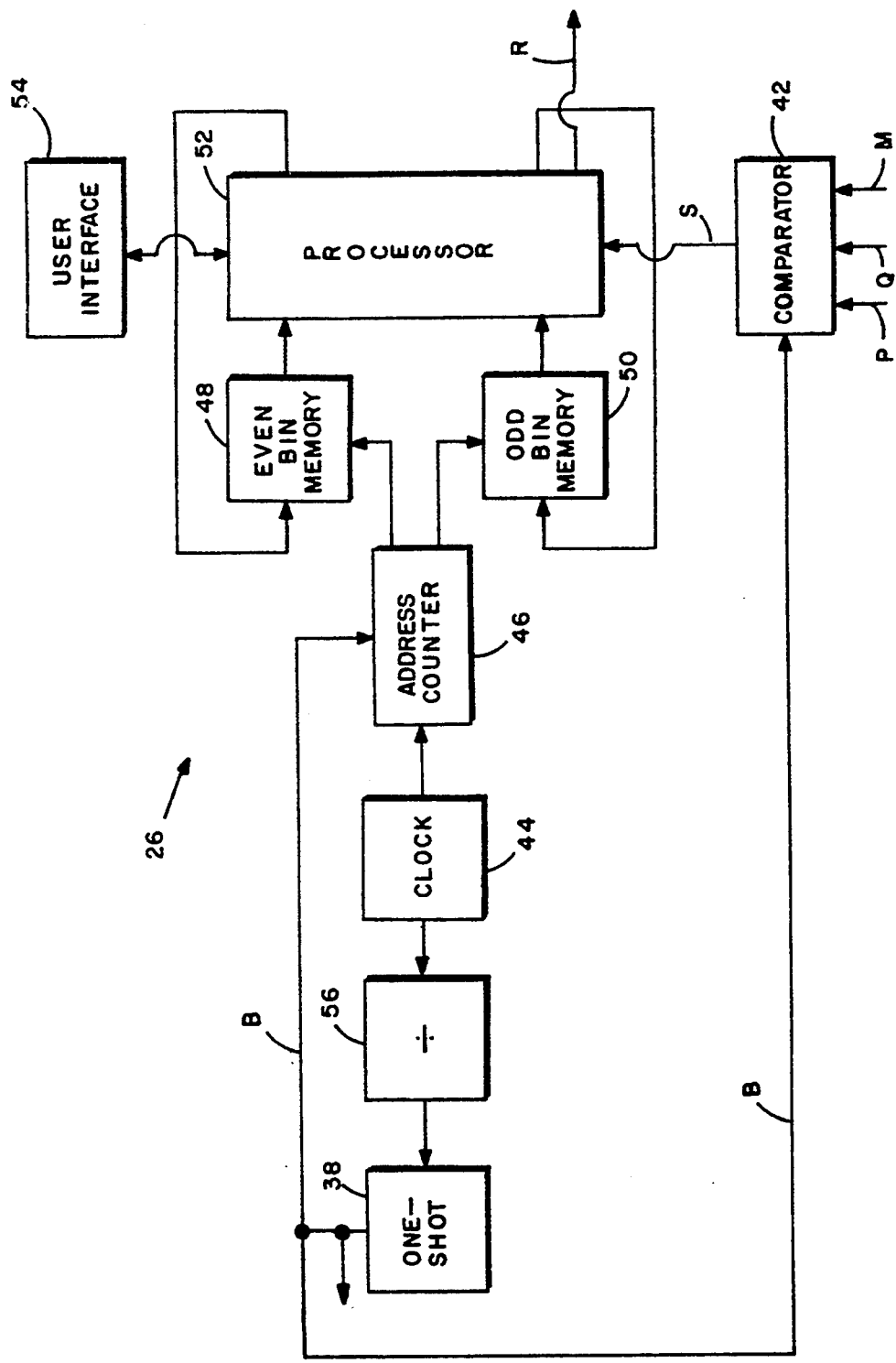
FIG. 2 is a block diagram of the hop detector of FIG. 1.

Hop detector 26 can for example be a device such as is shown in FIG. 2. Hop detector 26 of FIG. 2 includes comparator 42, clock 44, address counter 46, memory 48, memory 50 and processor 52. Comparator 42 receives the signal produced by logarithmic processor 22, and is preset to pass therethrough only signals having desired amplitudes and frequencies. Clock 44 pulses address counter 46, which in turn addresses memory 48 and memory 50 to each alternately produce data stored at the addressed locations. Signals from comparator 42, memory 48, and memory 50 are received by processor 52. If processor 52 recognizes sufficiently short dwell time at a frequency in the stored signal data from memory 48 and memory 50 plus new data from comparator 42, then processor 52 produces an impulse. A user terminal or single board computer 54 can be used to set or control threshold(s) or criteria of comparator 42 and/or processor 52.

Processor 24 generates one center finder pulse per signal per sweep. Impulse generator 38 resets counter 46 at the start of each local oscillator 14 sweep. Hop detector 26 monitors whether there is a center finder pulse within each local oscillator 14 sweep duration. Clock 44 can control impulse generator 38 via divide-by or divider 56. Divide-by-N 56 receives the clock 44 signal and produces a signal of reduced frequency (such as 10 KHz). The signal produced by divide-by-N 56 is provided to impulse generator 38, which can then be an edge-triggered one-shot device.

Figure 3:
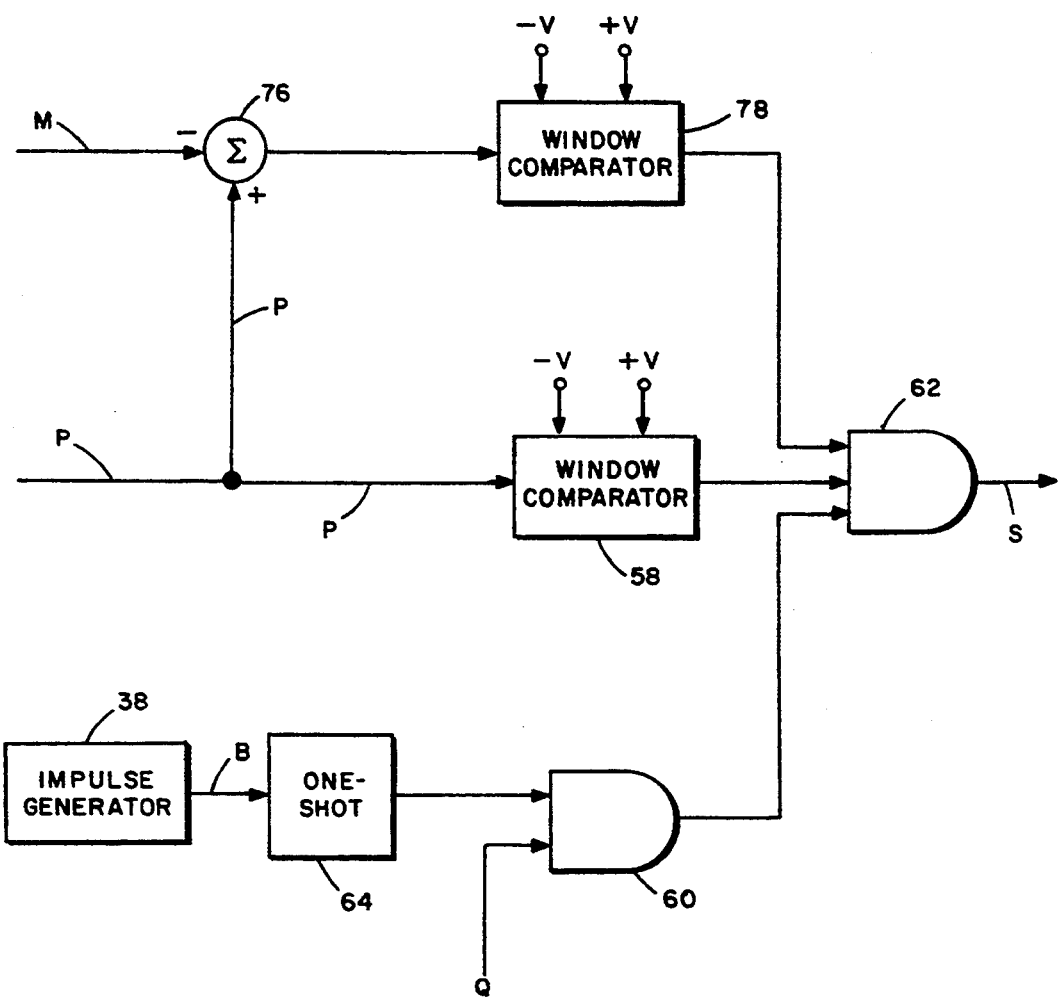
FIG. 3 is a diagrammatic representation of a portion of the hop detector of FIG. 2.

Comparator 42 is shown in greater detail in FIG. 3. As shown in FIG. 3, comparator 42 includes window comparator 58, AND gate 60, AND gate 62, and one-shot device 64. Window comparator 58 receives the signal produced by logarithmic processor 22, and is preset to produce an active or logic "1" signal if a signal is present whose amplitude is within a preset desired range. One-shot device 64 is triggered by impulse generator 38 at the start of each local oscillator 14 sweep. When triggered, one-shot device 64 produces, after any preset desired delay, a pulse of preset length. If processor 24 produces a center finder pulse during a one-shot device 64 pulse, then AND gate 60 produces an active or logic "1" signal. Thus, one-shot device 64 and AND gate 60 operate together as a frequency window comparator, providing an active output signal if the frequency of a transmitted signal is within a predetermined frequency range. Accordingly, a frequency window comparator can be substituted for one-shot device 64 and AND gate 60. AND gate 62 receives, as inputs, the output signals from window comparator 58 and AND gate 60, and produces an active or logic "1" signal only if all inputs and active or logic "1". An active or logic "1" output signal from AND gate 62 indicates presence of a qualified signal, and so is used to trigger processor 52.

Signals enter receiver 10 via antenna 12. Impulse generator 38 produces an impulse at preset regular time intervals. The pulse repetition rate of impulse generator 14 should be set at at least the Nyquist rate for the modulation bandwidth of the desired signal. The output B of impulse generator 38 is provided to dispersive delay line 40. Impulsing dispersive delay line 40 causes that DDL to generate a chirp signal C that for example can have repetitive successive sweeps of linearly increasing frequency with time. Using a dispersive delay line 40 to provide the chirped local oscillator 14 signal C saves space and power. Signals A from antenna 12 are mixed by mixer 16 with the chirp signal C from local oscillator 14. The output D of mixer 16 is provided to dispersive delay line 18, which performs pulse compression on that signal D. Dispersive delay line 18 has a delay versus frequency characteristic which is preferably conjugately matched to that of dispersive delay line 40. The output E of dispersive delay line 18 is a series of intermediate frequency (IF) pulses which correspond to or are representative of transmitted signals A received at antenna 12. See the discussion of compressive receiver operation in U.S. Pat. No. 4,247,939. The amplitude of the pulses produced by dispersive delay line 18 track linearly, or indicate, the amplitudes of the signal A from antenna 12, and the times of DDL 18 output pulse occurrence, relative to the start time of the chirp sweep of local oscillator 14, are linearly related to, or indicate, the antenna 12 signal A frequencies. In effect, the output E of dispersive delay line 18 is a chirp transform, similar to an inverse Fourier transform, of the incoming signals A, since frequency domain properties or characteristics of signals A have in signal E been linearly converted to time domain properties or characteristics. Thus, operations performed in the time domain on the output E of dispersive delay line 18 are equivalent to frequency domain manipulations such as of frequency A.

The apparatus of FIG. 1 performs operations in the time domain which cause frequency hopping signals, or any desired signal, to be downconverted to a fixed intermediate frequency (IF) for easier demodulation. If a received signal is hopping about in frequency, then dehopping of that signal is accomplished. Such de-hopping is accomplished by dispersive delay line 20, dispersive delay line 28, and frequency hopping detect logic 26. Hop detect logic 26 examines the series of pulses E coming from dispersive delay line 18 from sweep to sweep. Each time that dispersive delay line 40 is impulsed, it generates a chirp which sweeps the desired frequency band. Hop detect logic 26 recognizes conventional (non-hopping) signals primarily by their relatively long presence at a given frequency. Hopping signals stand out by their relatively short dwell times on a given frequency. When hop detector 26 detects a hop, it generates an impulse which is provided to dispersive delay line 28 and causes dispersive delay line 28 to generate a chirp which has substantially the same slope (delay versus frequency characteristic) as the dispersive delay line 40 chirps but are delayed in time by an amount proportional to the frequency of the new detected hop. When the dispersive delay line 28 chirp is mixed by mixer 30 with the output F of dispersive delay line 20 (which signal is effectively the inverse chirp transform (similar to the forward Fourier transform of signal A), the difference product H produced by mixer 30 is a constant frequency signal that is independent of the signal A frequency. This de-hopped intermediate frequency (IF) can be set to a convenient value by adding a small amount of delay between the hop detector generated impulse and dispersive delay line 28, such as via inserting fixed delay 66 (such as a delay line) between hop detector 26 and dispersive delay line 28. Mixer 30 produces a signal H which indicates the difference between dispersive delay line 20 signal F and dispersive delay line 28 signal G. Signal H is filtered by low pass filter 32. The filtered signal from filter 32 is demodulated by a suitable conventional demodulator 34. The demodulated signal produced by demodulator 34 is provided to a suitable conventional monitor 36 such as headphones.

By using dispersive delay lines 18 and 20 to take forward and then inverse transforms of a signal, demodulation of a frequency hopping signal can be accomplished with a single receiver with modest size, weight, and power requirements. Dispersive delay lines often require constant temperature ovens which have large power consumptions. By using substantially identical or matched dispersive delay lines in the apparatus of FIG. 1, the output de-hopped IF frequency is held very constant, despite any ambient temperature fluctuations, by the differential nature of receiver 10. For example, the output intermediate frequency (IF) signal is obtained by mixing the outputs F and G respectively of dispersive delay line 20 and dispersive delay line 28, which dispersive delay lines have substantially identical slopes. Absolute changes in delay through each dispersive delay line due to changing temperature are thereby effectively balanced out. The actual IF output is determined by the time delay, set by delay 66, between hop detect logic 26 and dispersive delay line 28. Truly identical dispersive delay lines can be utilized in receiver 10 by using sideband inversion to generate up-chirps and down-chirps as needed.

Another advantage of receiver 10 is a "built-in" delay in dispersive delay line 20 which stores the desired signal A (produced as signal F) in dispersive delay line 20, while the local oscillator-type signal G required to de-hop signal F (and thus signal A) is being generated in dispersive delay line 28. This enables complete recovery of even the leading edge of very fast hoppers.

It should be understood that the present invention can be utilized with any desired signal. Any desired signal, not just hoppers, can be received in this manner. Also, outputs of multiple down-convert dispersive delay lines can be mixed with the output F of dispersive delay line 20 to provide simultaneous recovery of multiple signals. These multiple receiver outputs are narrowband ("audio") and can be efficiently stored in digital tapped delay lines for sufficient intervals to allow baseband dwell time determination and "time stitching" or demultiplexing of simultaneous hopping signals. In another alternative embodiment of the present invention, the output of dispersive delay line 40 can be mixed, by a mixer, with the output of dispersive delay line 28 to generate an unmodulated carrier having the same frequency as the transmitted signal being de-hopped: This unmodulated carrier can be amplified and then used to jam the transmitted signal and/or it can be applied to a discriminator or frequency counter to measure the hop frequency.

The present invention can also be extended to two or more channels to provide monopulse direction finding (DF) for dehopping signals from transmitters located along specific angles of arrival. As another alternative, a system suitable for performing precision direction finding (DF) measurements on frequency hopping signals, using a correlation interferometry direction finding (CIDF) technique, or any other technique which takes platform scattering/multipath effects into account, can be realized by using one set of single "local oscillator dispersive delay lines", such as dispersive delay line 40 and dispersive delay line 28, with multiple channels of forward and inverse transforming dispersive delay lines, such as dispersive delay line 18 and dispersive delay line 20. Each set of transforming dispersive delay lines connect to a different antenna in a direction finding (DF) antenna array. The output of each such channel, after mixing by a mixer with the de-hop local oscillator chirp (such as signal G produced by dispersive delay line 28), can be compared in phase and amplitude using conventional measurement techniques, since the frequency hopping signal has been rendered as a constant frequency signal. However, the original frequency of signal A may be needed for DF calculations such as by a DF processor. Furthermore, time difference of arrival (TDOA) measurements can be made on the de-hopped modulation from multiple sites, thereby providing emitter location capability.

Also, in the present invention, desired signals can be recovered or demodulated without being continuously observed as long as the signal is revisited at a rate at least equal to the Nyquist rate for its modulation bandwidth. This allows the present invention to be swept over a very wide frequency range, beyond the instantaneous bandwidth of the dispersive delay lines. The lower the bandwidth of the desired channel, the less frequently it needs to be revisited for complete demodulation.

Dispersive delay lines 18, 20, 28 and 40, especially DDL 18, can for example each be a reflective array compressor (RAC), which provides a longer delay with a shorter crystal.

A bandpass filter can, if desired, be inserted or operatively interposed between antenna 12 and mixer 16, such as to restrict signal A to a desired range of frequencies, or to a desired center or carrier frequency and bandwidth. An amplifier can, if desired, be inserted or operatively interposed between that bandpass filter and mixer 16. Also, if desired, the frequency of signal A can be increased, such as by an additional mixer and local oscillator, before signal A is applied to mixer 16. Alternatively, the frequency of the signal produced by mixer 16 can be reduced, such as by an additional local oscillator and mixer disposed between mixer 16 and dispersive delay line 18.

As shown in FIGS. 1, 2 and 3, receiver 10 can be utilized with an additional antenna or antenna array 68 which is a directional or direction finding antenna or antenna array. The signal J from antenna 68 is mixed by mixer 70 with local oscillator 14 signal C. The signal K produced by mixer 70 is provided to dispersive delay line 72 similar to dispersive delay line 18. The signal L produced by dispersive delay line 72 is provided to logarithmic processor 74 similar to logarithmic processor 22. The signal M produced by logarithmic processor 74, which signal indicates amplitude comparison for monopulse direction finding, is then provided to hop detector or hop detection logic 26. Direction-finding logarithmic "video" type signal M is subtracted, by summer 76, from the signal N produced by logarithmic processor 22. The signal produced by summer 76 is provided to window comparator 78. The thresholds of window comparator 78 are set to define the desired DF acceptance window. The symbols +V and −V, indicating in FIG. 3 threshold or supply voltages provided to window comparators 58 and 78, are not necessarily identical nor of similar absolute value. The output signal of window comparator 78 is provided to AND gate 62. Alternatively, if utilization of a directional antenna or direction-finding capability are not desired, then antenna or array 68, mixer 70, dispersive delay line 72, logarithmic processor 74, summer 76 and window comparator 78 can be eliminated or disconnected from receiver 10.

Figure 4:
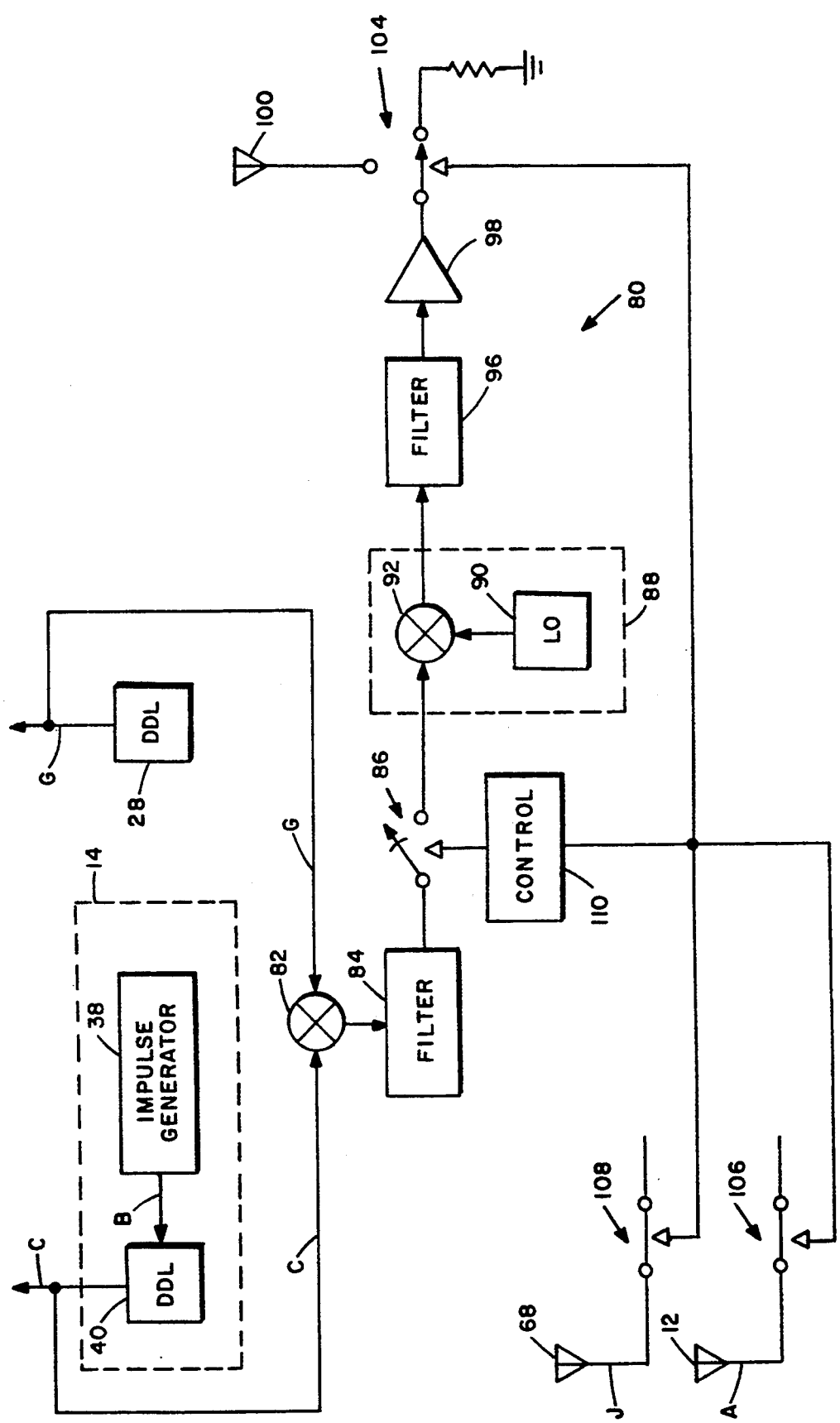
FIG. 4 is a block diagram of apparatus that can be added to the apparatus of FIG. 1.

There is shown in FIG. 4 a jammer 80 that can be used with receiver 10. FIG. 4 shows jammer 80 and a portion of receiver 10 connected thereto. Signal C produced by local oscillator 14, and signal G produced by dispersive delay line 28, are provided to, and mixed or multiplied by, mixer or multiplier 82. The signal produced by multiplier 82 is provided to pass filter 84, which can for example be a band pass filter or a low pass filter. The signal produced by filter 84 is provided to switch 86, which is preferably a PIN diode for fast operation. Opening switch 86 while receiver 10 is processing signal A permits receiver 10 to operate without interference from any signal from antenna 100. The output signal from switch 86 is provided to modulator 88. Modulator can for example be an FM modulator including local oscillator 90 and mixer 92. Local oscillator 90 can for example be a voltage-controlled oscillator (VCO) controlled by noise such as from a source of white noise or from a random number generator. Mixer 92 receives and mixes output signals from switch 86 and local oscillator 90. Alternatively, modulator 88 can be an AM modulator including a variable attenuator controlled by a noise source or by a random number generator. Alternatively, modulator 88 can be a different modulator. The output signal produced by modulator 88 is a noise modulated signal of similar characteristics to signal A. The signal produced by modulator 88 can, if desired, be provided to and filtered by pass filter 96 such as a band pass filter to ensure that the signal from antenna 100 is in the appropriate band. The signal from filter 96, or alternatively the signal directly from modulator 88, is provided to power amplifier 98 and therefrom to antenna 100. The signal produced by antenna 100 can be used to jam the transmission of the signal received by antenna 12. Preferably, switch 86 is switched off for a few local oscillator 14 sweeps in order to permit receiver 10 to determine the frequency and any other desired characteristics of signal A, so that the jamming signal provided to antenna 100 can be more effective. Switch 86 can then be switched on, such as by a timer or a counter connected to impulse generator 38, to permit transmission of a jamming signal from antenna 100 for a set period.

Figure 5:
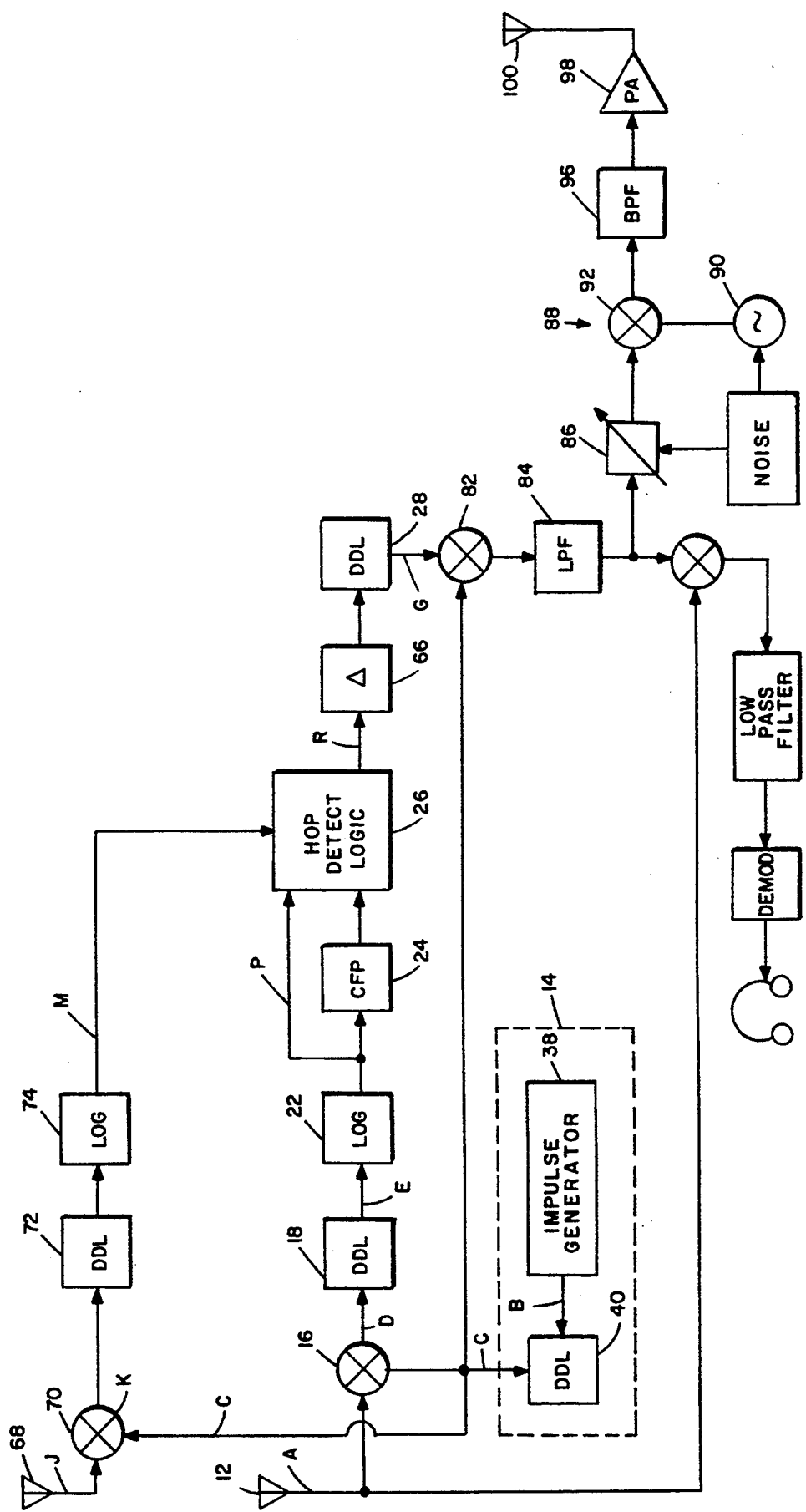
FIG. 5 is a block diagram of another apparatus according to the present invention.

An alternative receiver and jammer 102 is shown in FIG. 5. In receiver/jammer 102, dispersive delay line 20 and mixer 30 of FIG. 1 are deleted. Otherwise, structure and operation of receiver/jammer 102 is similar to that of receiver 10 of FIG. 1 and jammer 80 of FIG. 4.

Some of the many advantages of the present invention should now be readily apparent. For example, novel apparatus and method for receiving and jamming frequency hopping and other signals have been shown. Such apparatus and method does not have substantially large power requirements, so that portability and concealability are improved.

Obviously, many modifications and variations of the present invention are possible in light of the above teachings. It is therefore to be understood that, within the scope of the appended claims, the invention may be practiced otherwise than as specifically described.

What is claimed is:

1. Apparatus for detecting a frequency hopping signal, comprising:
   an antenna;
   first means, operatively connected to said antenna, for transforming a signal from said antenna;
   second means, operatively connected to said first means, for detecting any frequency hopping in the transformed antenna signal; and
   third means, operatively connected to and responsive to said second means, for converting the any detected frequency hopping in the transformed antenna signal to a non-hopping signal having a predetermined center frequency.

2. Apparatus as recited in claim 1 wherein said second means comprises means for timing the dwell of the transformed antenna signal at a frequency.

3. Apparatus as recited in claim 1, further comprising:
   modulating means, operatively connected to said third means, for modulating the non-hopping signal to produce a modulated signal; and
   transmitting means, operatively connected to said modulating means, for transmitting the modulated signal.

4. Apparatus as recited in claim 1 wherein said third means comprises:

a first dispersive delay line operatively connected to said second means;

a second dispersive delay line receiving the transformed antenna signal; and mixing means, operatively connected to said first dispersive delay line and said second dispersive delay line, for mixing signals respectively produced by said first and second dispersive delay lines to produce the non-hopping signal.

5. Apparatus as recited in claim 1, further comprising:

fourth means, operatively connected to said third means, for removing any non-hopping portion of the transformed antenna signal from the non-hopping signal.

6. Apparatus as recited in claim 5 wherein said fourth means comprises a low pass filter.

7. A method for detecting a frequency hopping signal, comprising:

transforming a first signal;

detecting any frequency hopping in the transformed signal; and converting the any detected frequency hopping in the transformed signal to a non-hopping signal having a predetermined center frequency.

8. A method as recited in claim 7 wherein:

said detecting step comprises timing the dwell of the first signal at a frequency.

9. A method as recited in claim 7, further comprising:

after said converting step, removing any non-hopping portion of the transformed signal from the non-hopping signal.

* * * * *